(12) United States Patent
Fuchiwaki

(10) Patent No.: US 7,821,897 B2
(45) Date of Patent: Oct. 26, 2010

(54) INFORMATION RECORDING/REPRODUCING APPARATUS AND INFORMATION RECORDING METHOD

(75) Inventor: Atsushi Fuchiwaki, Yokohama (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 912 days.

(21) Appl. No.: 11/492,262

(22) Filed: Jul. 24, 2006

(65) Prior Publication Data

US 2007/0127340 A1    Jun. 7, 2007

(30) Foreign Application Priority Data

Dec. 7, 2005   (JP) .............................. 2005-353331

(51) Int. Cl.
G11B 11/00    (2006.01)
(52) U.S. Cl. ................................. 369/53.31; 369/53.36
(58) Field of Classification Search ........................ None
See application file for complete search history.

(56) References Cited

U.S. PATENT DOCUMENTS 6,560,181 B1 *  5/2003  Takahashi ................ 369/53.35

2005/0201229 A1 * 9/2005  Sasaki ...................... 369/53.16
2006/0126472 A1 * 6/2006  Hwang et al. ............. 369/53.17

FOREIGN PATENT DOCUMENTS

| JP | 10-064191 A | 3/1998 |
| JP | 2000-076802 A | 3/2000 |
| JP | 2001-143399 A | 5/2001 |
| JP | 2004-319078 A | 11/2004 |
| JP | 2005-129168 A | 5/2005 |
| JP | 2005-160060 | 6/2005 |
| JP | 2005-293779 | 10/2005 |

* cited by examiner

*Primary Examiner*—Paul Huber
(74) *Attorney, Agent, or Firm*—Townsend and Townsend and Crew LLP

(57) ABSTRACT

An information recording method using a read modify write operation includes determining whether a write command is inconsistent or not, on the basis of a unit of a cluster. When the write command onto the rewritable type optical disk needs verification and the read modify write operation is executed, then a verify process is conducted only upon a part of the information, which is written through the read modify write operation. The method achieves an increase in recording speed and an improvement on reliability of recorded information through the read modify write, even when the verify process is unnecessary.

8 Claims, 7 Drawing Sheets

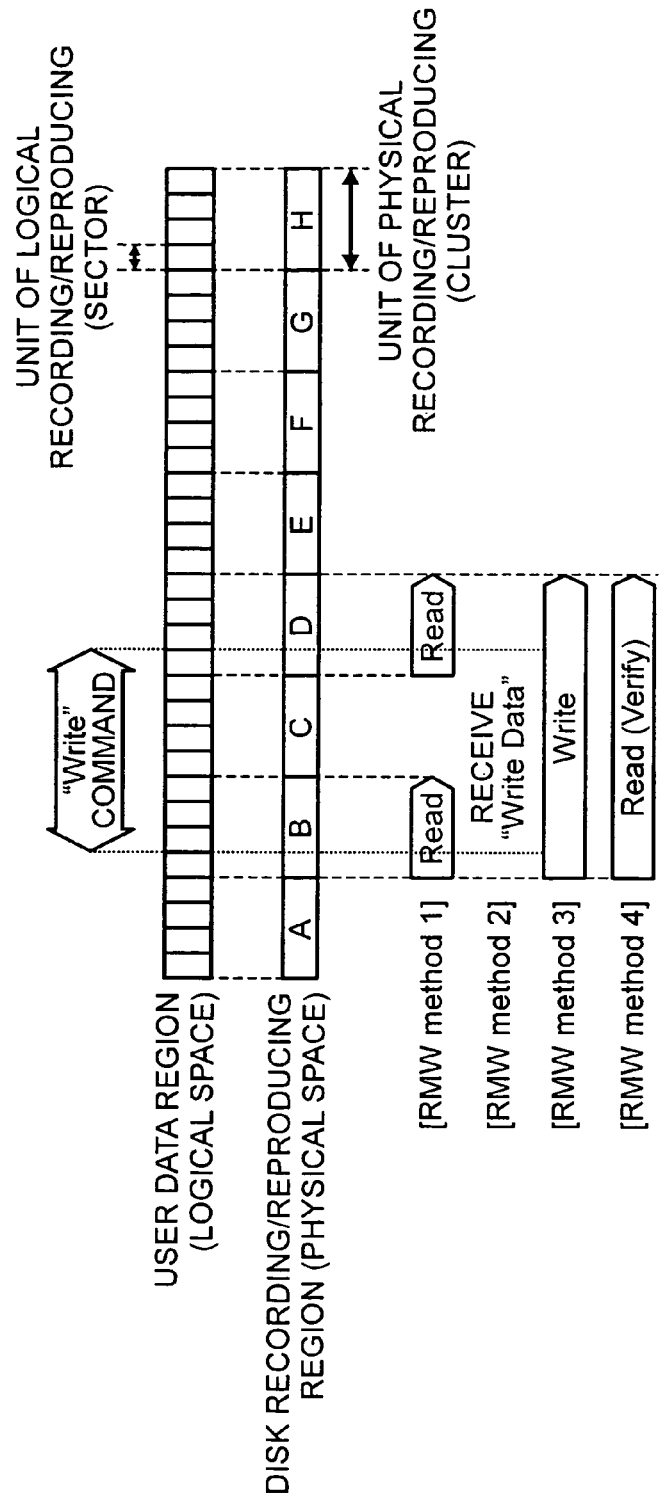

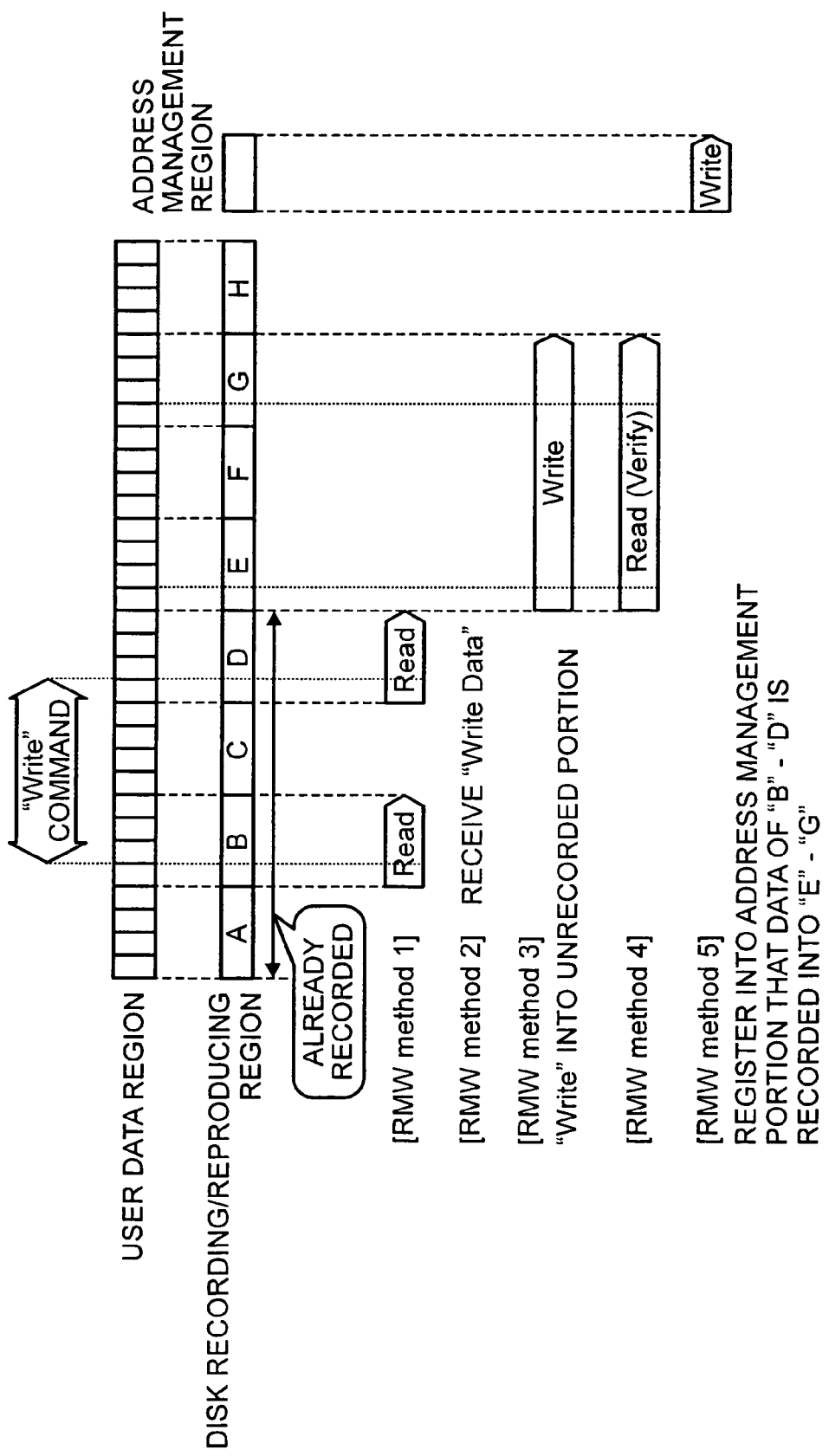

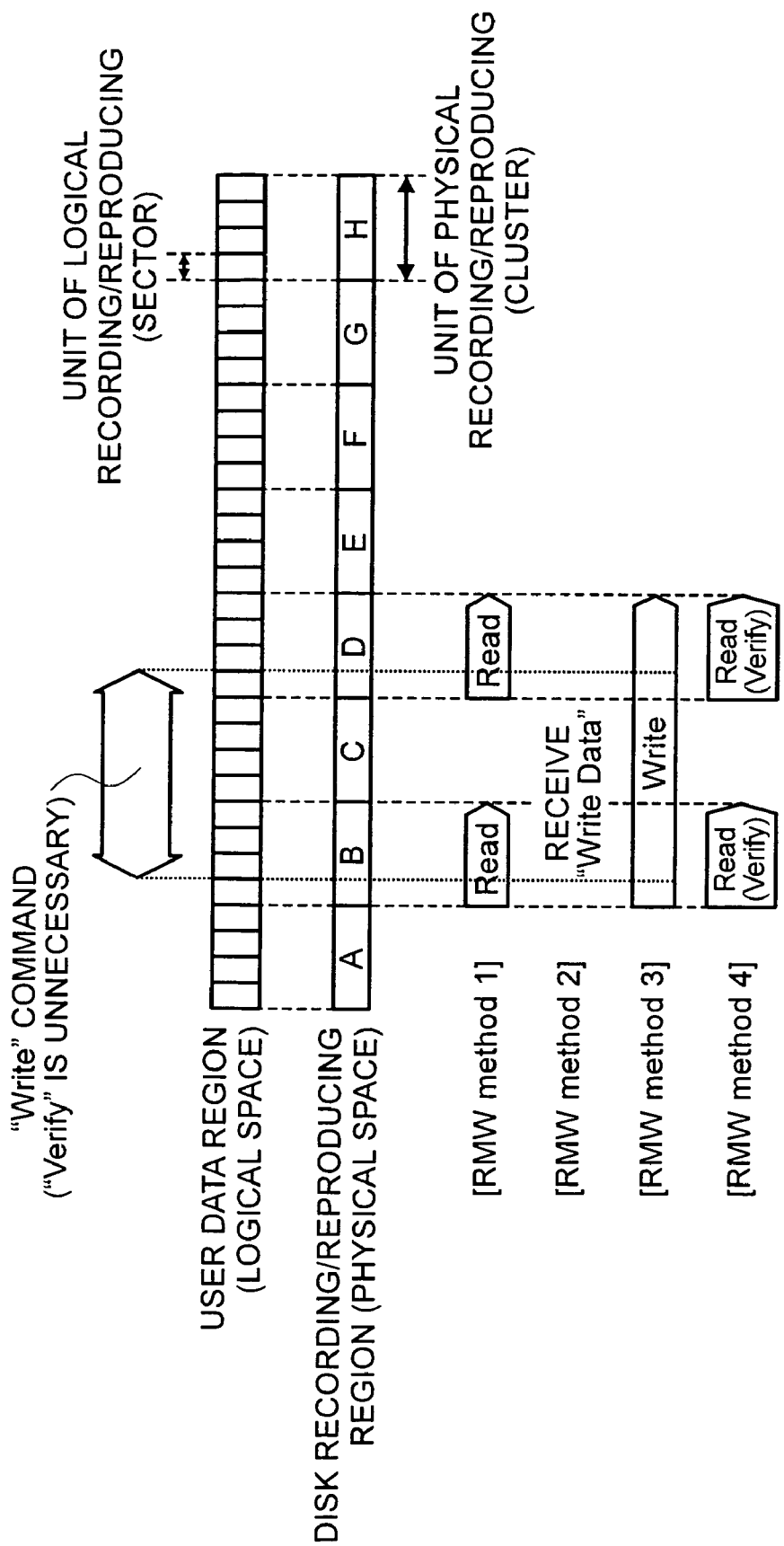

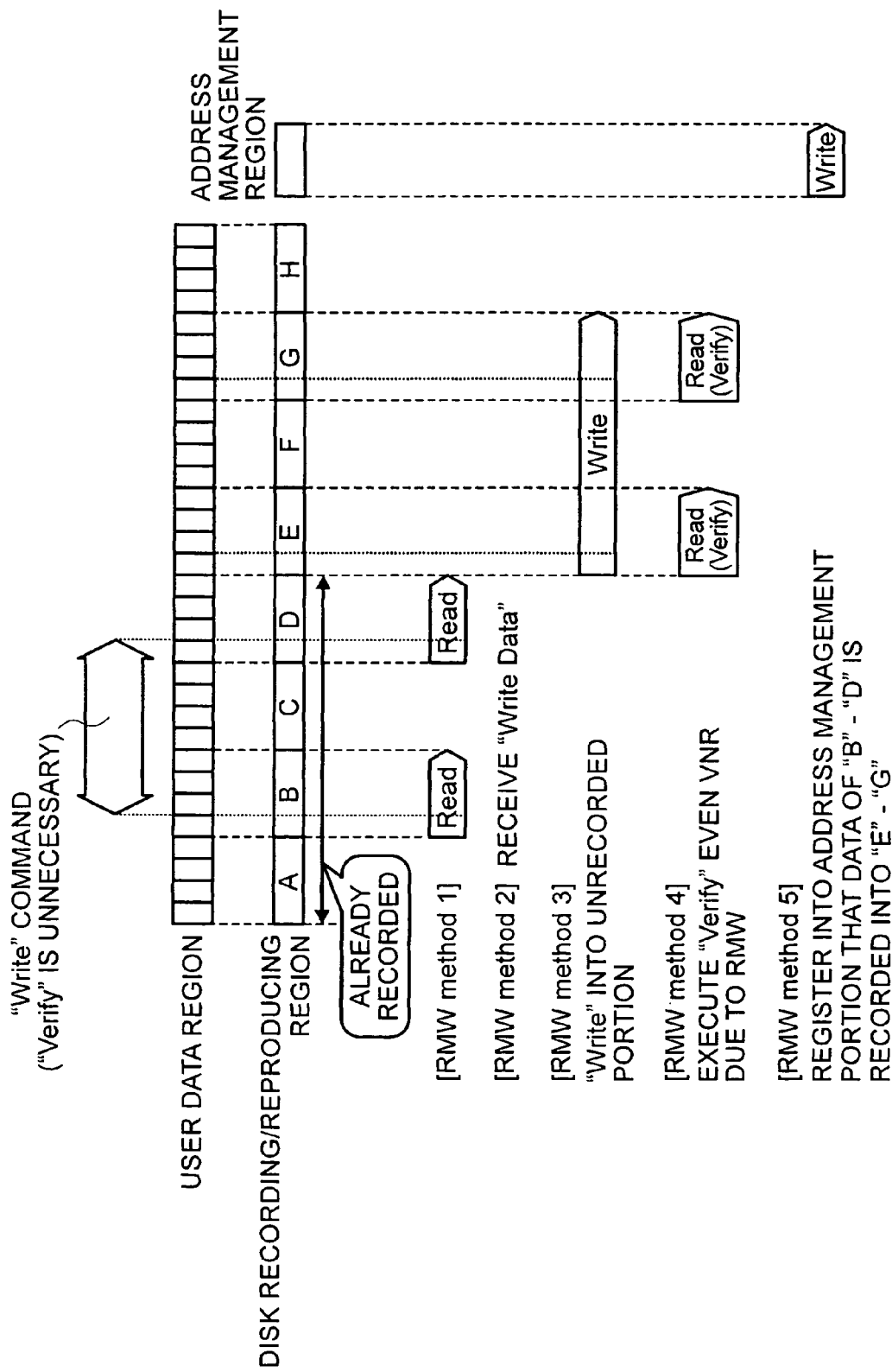

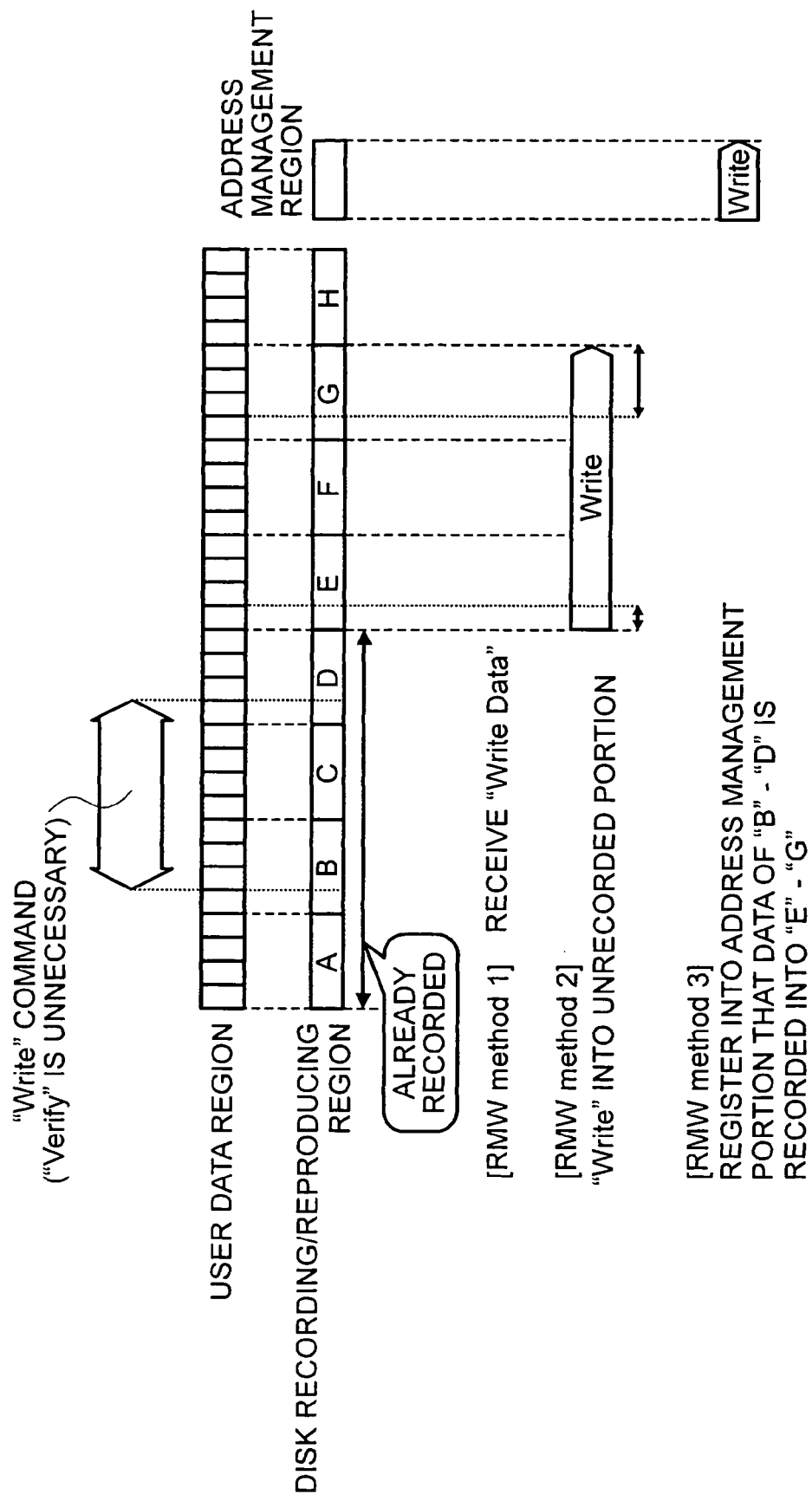

INFORMATION RECORDING/REPRODUCING APPARATUS AND INFORMATION RECORDING METHOD

BACKGROUND OF THE INVENTION

The present invention relates to an information recording/reproducing apparatus, for enabling to record information onto a rewritable optical information recording medium, including next-generation DVD, etc., responding to a write command issued from a host (computer), for example, including a recording operation called by "Read Modify Write", and further it relates to an information recording method to be applied into such the apparatus.

An optical disk, i.e., a disc-like information recording medium, is widely used to be an information recording media of non-contact, a large memory capacity and a low-cost, as well as, enabling high-speed data access, for recording digital audio data and/or digital video data, and further data of a personal computer. Further, in recent years, attention is paid upon so-called, the next-generation DVD, such as, HD-DVD and BD, etc., as being an optical information recording medium enabling recording/reproducing of information at higher density.

However, on such the optical disk of rewritable type, as the next-generation DVD, enabling recording/reproducing of information at high density, for example, representatively, for the purpose of guaranteeing reliability of data recorded, when data is recorded on a recording surface thereof, there is defined a ECC (Error Correction Code) block with an assembly of a predetermined number of sector fields. However, in case when recording the data provided from the host computer, which does not fulfill or satisfy the ECC block mentioned above, onto such the information recording medium, for example, readout is made on the ECC block, including an objective sector field to be an address of recording therein, to be replaced with write data at a predetermined number of bites of the objective sector, and recording is conducted, again, upon the recording medium by a unit of ECC block. Such recording operation, being recorded by a unit sector field, it is called by "Read Modify Write", in general. And, in such recording method as was mentioned above, for the purpose of guarantee of reliability of data recorded (i.e., recording quality), it is general to conduct the so-called verify process thereon.

By the way, with conducting such verify process as was mentioned above, it is possible to improve the recording quality; however, on the other hand, it takes time for that process, therefore, it is not always preferable, from a viewpoint of recording speed of information (i.e., record transmission speed). Then, for example, in the following Patent Document 1, there is already proposed a method of determining on whether the verify process should be conducted or not, with determining the contents of data to be recorded from structures, classification, attribute information, etc., of the record data, such as, moving pictures and/or still pictures, for example, when recording the data onto the optical disk, thereby executing the recording process. Thus, with this, it is possible to increase the reliability of the record data while suppressing the decrease of record transmission speed of data.

On the other hand, for enabling reproducing the information from such the information recording medium as mentioned above, with high reliability, for example, in the following Patent Document 2, there is already proposed a method of dividing a substitution block into a plural number of sub-blocks when alternating or replacing a defect block (i.e., ECC block N), which includes a defect region therein, by the substitution block (i.e., ECC block M) within a substitution area or region, thereby setting up bitmap information, for discriminating between a substituted sub-block where alternation is made on the data therein and a non-substituted sub-block where no alternation is made on the data is therein, within the defect management information. Thus, even in a case where the defect management is conducted by a unit of the block, it is possible to change or alter the data within a region smaller than the block, and as a result thereof, reproduction of data can be made with high reliability from the information recording medium.

Patent Document 1: Japanese Patent Laying-Open No. 2005-160060 (2005); and

Patent Document 2: Japanese Patent Laying-Open No. 2005-293779 (2005).

BRIEF SUMMARY OF THE INVENTION

However, with the conventional art (in particular, the former one), the following drawback is pointed out, in particular, when it is applied into an information recording/reproducing apparatus of conducting the recording of data in accordance with such the recoding method, "Read Modify Write" as was mentioned above.

Thus, as was mentioned above, in particular, about data of the unit not satisfying the ECC block (i.e., a cluster), it is general to conduct the verify process upon it, for guaranteeing the reliability (i.e., the recording quality) in case when recording it, but on the other hand thereof, in case when the verify process is not executed upon it, following the determination of not executing (i.e., non-necessity) of the verify process, it is impossible to guarantee the reliability of data which is recorded on the optical disk in accordance with the "Read Modify Write".

Then, according to the present invention, by taking the drawbacks of the conventional arts mentioned above into the consideration thereof, an object thereof is to provide an information recording/reproducing apparatus achieving an improvement on the recording speed as a whole, while keeping the reliability of information recoded through the "Read Modify Write" operation, in particular, even when no such the verify process is conducted thereon, and also an information recording method for that.

For achieving the object mentioned above, according to the present invention, firstly there is provided an information recording/reproducing apparatus, comprising: a spindle motor for rotationally driving an optical disk of rewritable type at a predetermined speed; an information recording portion for recording information thereon, through irradiating a laser beam upon an information recording surface of said rewritable type optical disk, which is rotationally driven by said spindle motor; an information reproducing portion for reproducing information recorded thereon, through detecting a reflection laser light upon the information recording surface of said rewritable type optical disk; and a controller portion for controlling operations of those portions mentioned above, thereby enabling a read modify write operation upon said rewritable type optical disk, wherein: determination is made on whether a write command is in consistent or not, with a unit of cluster of said rewritable type optical disk, when said write command onto said rewritable type optical disk needs no verify process thereon, and said read modify write operation is executed when determining inconsistency between them, as well as, conducting the verify process only upon a part of the information, which is written through said read modify write operation.

In addition to the above, according to the present invention, also for achieving the object mentioned above, there is further provided an information recording method for recording desired information on an information recording surface of a rewritable optical disk, through a read modify write operation with recoding or reproducing of information, comprising the following steps of: determining on whether a write command is consistent or not, with a unit of cluster of said rewritable type optical disk, in case when the write command onto said rewritable type optical disk does not need a verify process thereon; and executing said read modify write operation when determining inconsistency between them, as well as, conducting the verify process only upon a part of the information, which is written through said read modify write operation.

Further, according to the present invention, within the information recording/reproducing apparatus or the information recording method as described in the above, preferably, the information, upon which said verify process is executed, is that of clusters in front and rear of clusters corresponding to said write command, by a unit of cluster of said rewritable optical disk, and further said verify process upon the clusters in front and rear of the clusters corresponding to said write command is executed by a seek operation of said apparatus. Or, within the apparatus or the method described in the above, preferably, said information is written onto the information recording surface of said rewritable optical disk without executing said read modify write operation, when the write command to said rewritable optical disk does not need the verify process and said write command is consistent with the unit of cluster of said rewritable optical disk.

Also, alternately, within the information recording/reproducing apparatus or the information recording method as described in the above, preferably, when readout is impossible in part of the clusters corresponding to said command upon executing said read modify write operation, said read modify write operation is executed with adding information indicative of a correct information position in part of sectors of user data corresponding to said clusters, or said verify process is not executed when a ultra high-speed recording is requested.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIG. 3 is a view for explaining a normal "Read Modify Write" operation within the information recording/reproducing apparatus (on Rewritable disk: BD-RE), for explaining the principle of the present invention;

FIGS. 4(A) and 4(B) are views for showing the conditions of a buffer memory of the information recording/reproducing apparatus, when it is in the operation shown in FIG. 3;

FIG. 5 is a view for explaining a normal "Read Modify Write" operation within the information recording/reproducing apparatus (on Un-rewritable disk: BD-R), for explaining the principle of the present invention;

FIG. 6 is a view for showing the operations when executing "Read Modify Write", according to the information recording method of the present invention (on Rewritable disk: BD-RE);

FIG. 7 is a view for showing the operations when executing "Read Modify Write", according to the information recording method of the present invention (on Un-rewritable disk: BD-R); and FIG. 8 is a view for showing the operations when executing "Read Modify Write" (in particular, when error occurs during the reading operation), according to the information recording method of the present invention (on Un-rewritable disk: BD-R).

DETAILED DESCRIPTION OF THE INVENTION

Hereinafter, embodiments according to the present invention will be fully explained by referring to the attached drawings.

Figure 1:
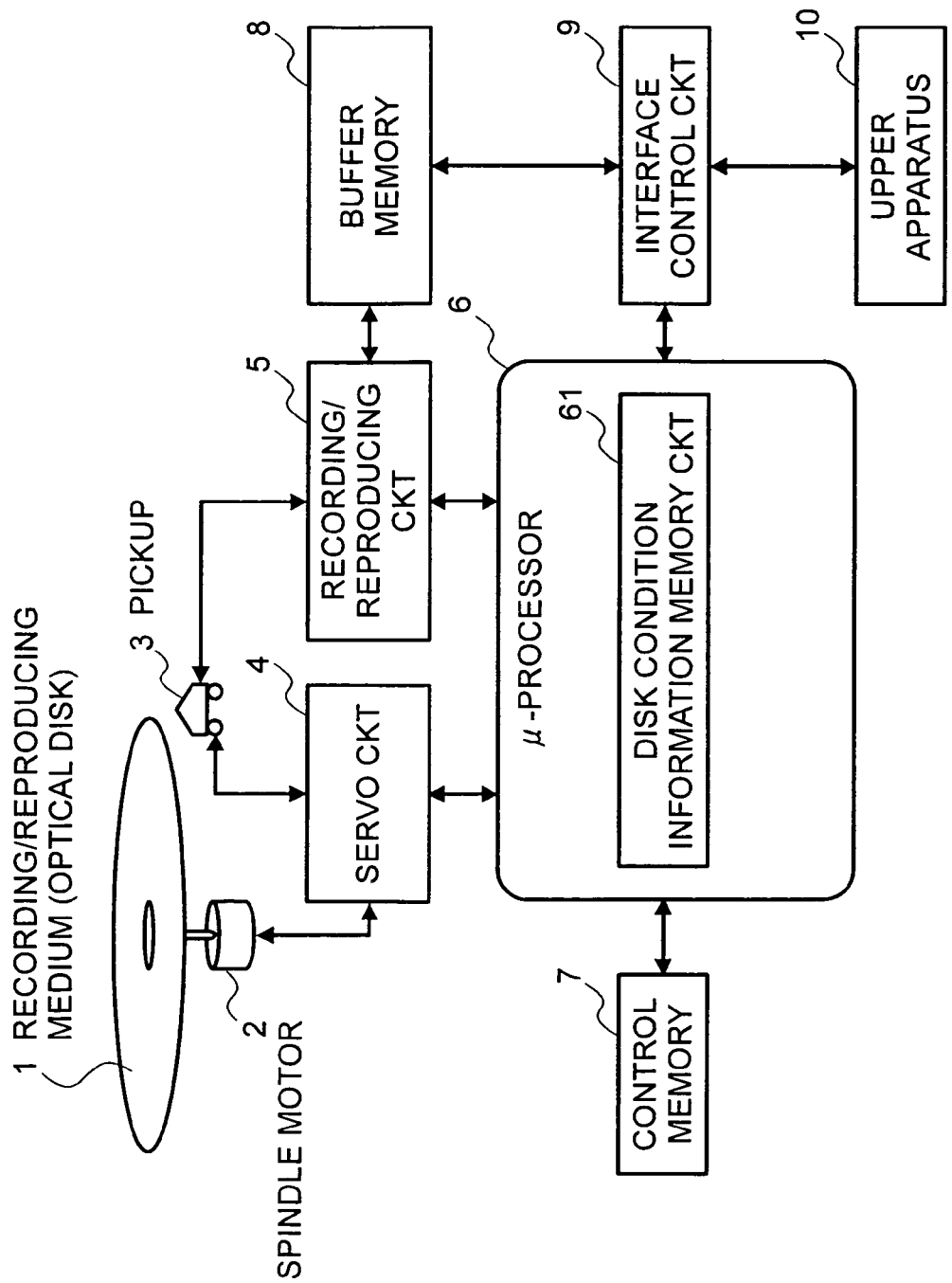
FIG. 1 is a block diagram for showing the outlook structures of an information recording/reproducing apparatus, according to an embodiment of the present invention.

First of all, FIG. 1 shows the outlook structures of an information recording/reproducing apparatus, according to an embodiment of the present invention.

In this FIG. 1, an optical disk 1, i.e., a recording/reproducing medium is rotated at a predetermined rotation speed by means of a spindle motor 2. A pickup 3, including a laser light source and a photo-detector, and also an optical lens system therein, irradiates a laser beam upon the optical disk 1, thereby conducting recording/reproducing of information. A servo circuit 4 controls the rotation of the spindle motor 2, and the position of the pickup 3 in the direction of disk radius, as well as, in the tracking direction and the focusing direction thereof. A recording/reproducing circuit 5 conducts a reproducing process, such as, digitizing, demodulation, decoding, error correction, etc., upon the signal that the pickup 3 reads out, and also it conducts a recording process, such as, modulation, compensation, etc., upon the signal to be supplied to the pickup 3. Data for recording/reproducing is reserved into a buffer memory 8, temporarily, and is transmitted, through an interface controller circuit 9, between an upper system or apparatus 10 (such as, a personal computer), which is provided outside. Upon receipt of a command from the upper apparatus 10, a microprocessor (μ-processor) 6 controls the servo circuit 4, the recording/reproducing circuit 5 and the interface controller circuit 9, thereby achieving controls upon various processes, such as, recording/reproducing operation, etc. A control memory 7 stores programs and data necessary for the controls.

However, within the information recording/reproducing apparatus mentioned above, when starting the recording/reproducing operation, the pickup 3 obtains management information through accessing (i.e., a seek operation) to a management information recording area, such as, DMA, etc., which is provided on an inner periphery or an outer periphery on the optical disk 1. The μ-processor 6 control sequences of the pickup 3, and upon basis of the management information obtained, it executes a setup of the apparatus into a recording/reproducing condition, which is adapted to the optical disk loaded therein. As a means for obtaining effective management information with preferable efficiency, in that instance, the μ-processor 6 comprises a disk condition information memory circuit 61 for memorizing the management information read out therein, once. However, this μ-processor 6 may comprises further, although not shown herein, a DMA error detector circuit for determining on whether the management information is normally read out or not, a DDS renewal time comparator circuit for comparing a number of times of renewals, which is described in each of the management information, and a DSI address comparator circuit for making comparison to determine if the addresses of the management information are consistent with or not, etc.

Further, within the information recording/reproducing apparatus equipped with such structures as was mentioned above, it is of course for the person skilled in the art, that various kinds of operations are performed through known functions/operations thereof, including the recording/reproducing operation of information onto the information recording medium, such as, the DVD that is characterized by recording of high density.

Next, by referring to the drawings attached herewith, explanation will be given about details of the information recording method according to the present invention, to be executed within the information recording/reproducing apparatus, the structures of which was mentioned in the above, as one example thereof. However, for better understanding of the present invention, first of all, explanation will be give about the information to be recorded through "Read Modify Write" operation mentioned above, in particular, by referring FIGS. 3 to 5 attached herewith.

First, FIG. 3 shows the processes of "Read Modify Write" conducted there in, for an over-writable optical disk, such as, BD-RE, etc., for example, and in particular, it shows "Read Modify Write" operation in case when the Write command issued from the upper apparatus (see the reference numeral 10 in FIG. 1) is on the data that is not consistent with the ECC block. Thus, as is apparent from the figure, the Write command from the upper apparatus is generated, as a unit of a user data area or region (e.g., a logic space), i.e., it is issued as a unit of sector (thus, by a unit of logic recording/reproducing).

On the contrary thereto, a recording/reproducing area or region (e.g., a physical space) on the optical disk is constructed with ECC blocks (A-H), each being a unit called by "cluster" (i.e., a physical recording/reproducing unit), which includes the sectors mentioned above in plural numbers thereof. For this reason, as is shown in the figure, when receiving a Write command inconsistent with the ECC block (i.e., not in the unit of cluster) from the upper apparatus, then the information recording/reproducing apparatus firstly read out the ECC blocks (of the unit of cluster) B and D corresponding to a front end and a rear end of the Write command inputted (see [RMW process 1] in the figure). Thereafter, it receives data to be written (i.e., "Write Data") therein (see [RMW process 2] in the figure). Next, it inserts (or substitute) the Write Data between the ECC blocks (i.e., the cluster), which was read out; thereby conducting the Write operation (see [RMW process 3] in the figure). Thereafter, the apparatus reads out the ECC blocks B-D completing the Write process thereon, so as to perform the Verify process thereupon (see [RMW process 4] in the figure).

However, the condition of the buffer memory, in this instance, is shown in FIGS. 4(A) and 4(B) attached herewith, which is provided within the information recording/reproducing apparatus (see the reference numeral 8 in FIG. 1 mentioned above). In particular, FIG. 4(A) shows the condition where data of the ECC clocks B and D from the optical disk is read therein, by the unit of cluster, when the Write command is inputted, but not in the unit of cluster, as is shown by [RMW process 1] in the above, and FIG. 4(B) shows the condition where the data to be written (i.e., Write Data) is received from the upper apparatus to be stored (i.e., inserted or substituted) thereafter.

Following to the above, FIG. 5 shows the process of "Read Modify Write" to be executed on the optical disk, on which overwrite operation cannot made, i.e., one (1) kind of the next-generation type DVDs mentioned above, such as, BD-R or the like, for example (i.e., logical overwrite: LOW). In this case, also since the unit of the logical access (i.e., the sector) from the host (i.e., the upper apparatus) is smaller than the unit of recording/reproducing of the disk (i.e., the cluster), there may be a case where the Write command is issued to a part(s) of the sectors within the clusters, which are already written, in particular, when recording is conducted through the logical overwrite (LOW) adopted in the BD-R, etc., on which the overwrite operation cannot be made. In this instance, also data is read out from the disk, upon which recording was already done to be merged with the Write Data, so as to prepare the Record Data by a unit of cluster, and thereby to be recorded on the disk; i.e., executing the "Read Modify Write" process.

However, also such similar processes be executed as was mentioned above, in this case, however as is apparent from the figure, within the "Read Modify Write" process to be executed on this optical disk, on which the overwrite operation cannot be made, after executing the [RMW process 4] mentioned above, further a registration is made into an address management area or region on the disk, upon which the recoding is done, of the fact that data of the ECC blocks B-D is recorded into other blocks E-G (i.e., correlation information) [RMW process 5].

As is apparent from the explanation given in the above, with the optical information recording medium of rewritable type, such as, the next-generation DVDs, representatively, for example, in particular, when conducting the "Read Modify Write" process to be executed due to inconsistence between the cluster, as the unit of recording/reproducing on the disk and the sector, as the unit of logical access from the host (i.e., the upper apparatus), not only the sectors within the region of the Write command, for which the Verify process is determined to be unnecessary, but also data outside that region, i.e., the sectors within the region of the clusters (e.g., B-D) corresponding to the Write command (in more details, sectors in front and back of the Write command) are re-written, even in the case if determining non-necessity of that Verify process due to the contents of the data to be written (for example, the moving pictures or the still pictures, etc.).

However, about the data within region of the Write command, there is no problem occurs therein, in case where the host does not request guarantee of the recording quality thereof. However, relating to the data outside the region of the Write command, in more details, the clusters upon which the writing operation is presently conducted (e.g., the clusters B-D in FIG. 3, and the clusters E-G in FIG. 5), but not included within the Write command (in other words, the sectors in front and back of the Write command), since there is a possibility that it is the data recorded by other host or the like, for example, therefore it is necessary to guarantee the recording quality of the data, at least in such portion.

The present invention is achieved upon such finding and acknowledge mentioned above, which are made by the inventor of the present invention, and there is provided an information recording method enabling to increase the recording speed as a whole thereof, with maintaining the reliability of the information recorded through the "Read Modify Write" operation, while taking the possibility of generating cases of not conducting the "Verify" operation upon also the data outside the Write command, when the "Verify" is not executed, as was mentioned above.

For that purpose, according to the present invention, first of all, even when the Write command is issued, which does not necessitate the Verify upon the Write Data to be written, as is shown in the figure, the "Read Modify Write" operation is executed in case when the said command is inconsistent with the clusters, i.e., a unit of recording/reproducing on the disk. In such case, the "Verify" process to be executed after the Write operation (see [RMW process 3]) is executed only part of the data that was written, in more details, corresponding to the said Write command, including sectors in the front and rear thereof, upon only the clusters B and D. With this, in the Verify process after the Write operation, since it is sufficient to execute the Verify process, upon not all of the clusters, onto which the Write is conducted, but only upon the two (2) clusters (i.e., "B" and "D" in case of the figure), therefore it is possible to increase or improve the recording speed as a whole. Also, with this Verify process, it is possible to maintain the reliability of the data, which is written thereon through the "Read Modify Write" operation. However, this example shows the case of being applied to the optical disk, upon which the overwrite operation can be made, such as, BD-RE, or the like, for example. The Verify process only upon two (2) clusters can be executed with using Seek operation, for example.

Further, FIG. 7 attached herewith shows the operations, in particular, in case when applying the information recording method mentioned above, according to the present invention, into the optical disk, upon which the overwrite operation cannot be made, such as, BR-R or the like, for example. Thus, similar to that shown in FIG. 6 mentioned above, among the clusters "E" to "G", on which rewriting is conducted through the "Read Modify Write" operation, the "Verify" process is executed only upon the clusters "E" and "G" in front and rear thereof, but not upon the cluster "F". However, with this, in the similar manner to that mentioned above, it is apparent that the reliability can be maintained upon the data that is written on through the "Read Modify Write" operation.

By the way, in the "Read Modify Write" operation, which is executed when the Write command is inconsistent with the clusters, i.e., the unit of recording/reproducing on the disk, as was mentioned previously, the cluster at read-in address is read out corresponding to that Write command; however, in such instance, there are sometimes cases where the data of that cluster cannot be read out (e.g., Read error). In such case, according to the present invention, the following processes will be carried out.

First, in case where ultra high-speed recording is not needed, in the similar manner to that shown in FIG. 7 mentioned above, correct address information of that data is written, in the place of the data that cannot be read out. Thus, in case of this figure, into portions (i.e., sectors) "SF" and "SB" in front and rear of the data (corresponding to the clusters "E" to "G") to be written through the "Read Modify Write" process, there are recorded the following information, respectively; i.e., information that correct data is stored within "B" in this region of the sectors, and that correct data is stored within "D" in this region of the sectors. With this, it is possible to execute the Write operation while maintaining the reliability of data (i.e., with guarantee of the recording quality), even in the case when the cluster at the write-in address cannot be read out in the "Read Modify Write" process.

On the other hand, in case where the ultra high-speed recording is needed, as is shown in FIG. 8 attached herewith, the following Write Data is set up and is written onto the disk, but without executing the "Read Modify Write" process; i.e., setting up the information that effective data lies within the cluster at the present position, in relation to the sectors outside the region of the command.

However, with the information recording method according to the present invention, the "Read Modify Write" process will not be executed in case when the Write command is issued by the unit of cluster, e.g., the unit of recording/reproducing on the disk (furthermore, including the case when the ultra high-speed is needed, therein), and therefore, the Verify process will not be executed.

Figure 2:
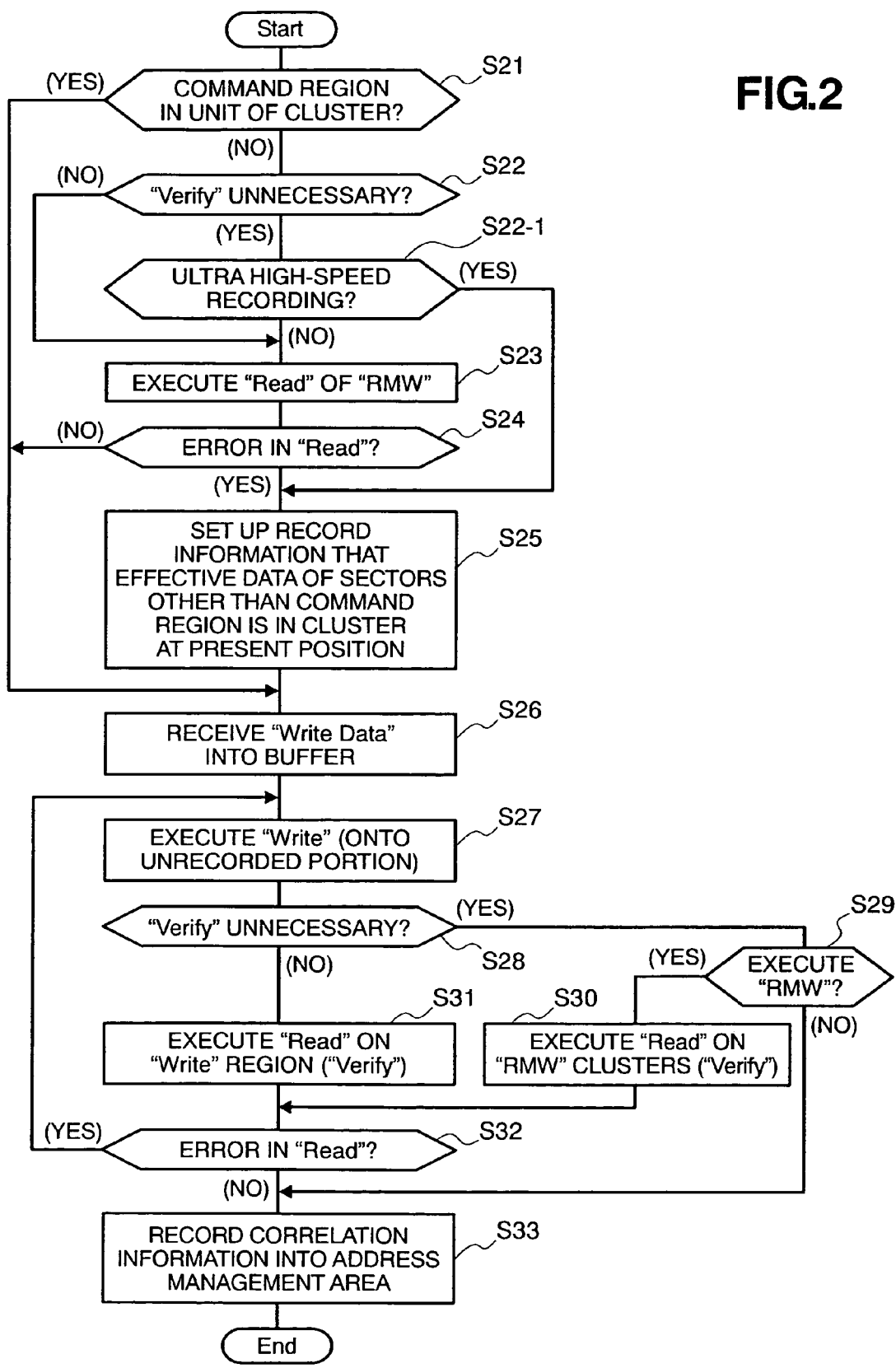
FIG. 2 is a flowchart for showing the details of an information recording method to be executed within the information recording/reproducing apparatus according to the present invention.

Next, hereinafter, explanation will be made on the detailed processes for practicing the information recording method, according to the present invention, within the information recording/reproducing apparatus, the entire structures of which was shown in FIG. 1 mentioned above, by referring to FIG. 2 attached herewith. However, the flowchart in this FIG. 2 is stored within the control memory 7, for example, in the form of a program necessary, and is executed by means of the microprocessor 6 building up the controller portion of the apparatus. Also, within the explanation which will be given below, the non-necessity of the Verify process may be determined by the information recording/reproducing apparatus upon basis of the structures, the kind, and/or the attribute information of the Record Data, such as, the moving pictures and/or the still pictures, etc., for example, as was mentioned previously, or alternately it may be issued from the a side of the host determining thereof, as a sort of the Write command. Also, in this example, explanation will be given, mainly, on the optical disk, upon which the overwrite operation cannot be made, such as, BD-R or the like, for example.

In FIG. 2, when the Write command is issued, a series of processes is started, and then, determination is made on whether the region of the Write command issued is in the unit of cluster or not (S21). As a result of this determination, if determining that the Write command issued is in the unit of cluster (YES), the process moves into a next step for executing the Write operation, e., into a step S26 (i.e., [RMW process 2] in FIG. 7) for receiving the Write Data into the buffer (see the reference numeral 8 in FIG. 1).

On the other hand, if the Write command is determined not in the unit of cluster (NO), as a result of the determination (S21) mentioned above, then determination is made on whether the Verify process is unnecessary or not (S22). As a result thereof, when the Verify process is determined to be necessary (NO), further determination is made on whether the ultra high-speed recording is necessary or not (S22-1). As a result of this, if the ultra high-speed recording in not necessary (NO), then setup is made for executing the "Read Modify Write" (RMW) process. First, read out (Read) is executed on the data of the clusters of write-in address (for example, the clusters "B" and "D" in FIG. 7) on the disk, and it is determined on if there is Read error or not, where the data of the clusters cannot be read out (S24). As a result thereof, when determining that there is no Read error (NO), then the process shifts into the step S26 mentioned above, for receiving the Write Data into the buffer. On the other hand, when determining there is the Read error (YES) in the determining step (S24), setup is made on information meaning that the effective data lies within the cluster at that present position (i.e., [RMW process 2] in FIG. 8 mentioned above), relating to the sectors outside the Write command, as the Record information (S25). Thereafter, the process moves into a step S26 for receiving the above-mentioned Write Data to be written into the buffer. Also, the process moves into the step S25 mentioned above, in case when determining the ultra high-speed recording is necessary (YES).

Thus, as is apparent from the explanation given in the above, when the Write command in the unit of cluster is issued, the Verify process is not executed, but the "Read Modify Write" (RMW) process is executed in the case when it is inconsistent with. And, for executing the "Read Modify Write" process, first read-out is made on the data in the clusters at the write-in address, and depending on necessity thereof, the Record Information is produced for the case of when the Read error occurs.

Thereafter, in the step 26, the Write Data to be written is received into the buffer, wherein editing may be made upon that Write Data depending on the necessity thereof. For example, in case when executing the "Read Modify Write" process, the Write Data is inserted (or substituted) between the clusters "B" and "D" which are read out, as is shown by [RMW process 2] in FIG. 7 mentioned above. Or, in case when the Read error occurs, the recording information is produced, by adding the information SF and SB in the front and the end of the Write Data, as is shown by [RMW process 2] in FIG. 8 mentioned above.

Next, the Write process is executed (S27), for example, on an unrecorded portion of the optical disk, on which the overwrite operation cannot be made, or on the clusters corresponding to the position of the command, on which the overwrite operation can be made. Thereafter, again, it is determined on whether the Verify process is unnecessary or not (S28). As a result thereof, when determining that the Verify process is unnecessary (YES), further determination is made on whether the "Read Modify Write" process is done or not (S29). As a result thereof, as was mentioned above, the data, the Write command of which is determined in the unit of cluster (YES) in the process S21, is determined not executed (NO) with the "Read Modify Write" process within the step S29. Also, in case where the non-necessity (YES) of the Verify process is determined in the step S28, too, the data is executed as it is, i.e., the Write process thereof is conducted onto the unrecorded portion.

On the other hand, in case when determining the non-necessity (YES) of the Verify process in the step S28, but determining that the "Read Modify Write" process is executed thereon (YES) in the step S29, in other words, about the data, upon which the Write operation is executed through the "Read Modify Write" process in the step S27, since the command is not in the unit of cluster (i.e., "NO" in the step S21), as was shown by [RMW process 4] in FIGS. 6 and 7, the Read operation is executed only part of the data, upon which the Write operation was executed; thereby executing the Verify process (S30). In more details, it is executed upon only the clusters "B" and "D" in the example of FIG. 6, and the clusters "E" and "G" in the example of FIG. 7.

Also, in case when determining the necessity (NO) of the Verify process in the step S28 mentioned above, as was shown by [RMW process 4] in FIGS. 3 and 5, the Read operation is executed only part of the data, upon which the Write operation was executed; thereby executing the Verify process (S31), in the similar manner to that in the normal "Read Modify Write" process.

Further, as the results of those Verify processes S30 and S31 mentioned above, determination is made on the presence of the Read error (S32). As a result thereof, in case when determining that the Read error exists (YES), the process turns back to the step S27, and thereby repeating a series of processes including the Write process mentioned above therein. On the other hand, in case when determining that no Read error exists (NO), the correlation information thereof is recorded into the address management area thereof (S33), thereby completing the series of processes.

Namely, with the information recording method, the details of which is mentioned in the above, when executing the Write process upon the rewritable optical information recording medium, the Verify process is not executed if it is not necessary, in case of determining the non-necessity of the Verify process; however the Verify process is executed on part of the information written thereon, for maintaining the reliability thereof, about the information recorded through the "Read Modify Write" operation, therefore it is possible to maintain the reliability (i.e., high quality) of the information recorded, as well as, increasing the recording speed thereof, and thereby providing a superior information recording/reproducing apparatus.

As was fully explained in the above, with the information recording/reproducing apparatus and the information recording method for that, according to the present invention, it is possible to obtain the following effects; i.e., increasing the recording speed, in case where the Verify process is not executed, of course, and in particular, maintaining the reliability of information recorded through the "Read Modify Write" operation (i.e., high quality) when the Verify process is not executed, thereby improving the recording speed as the information recording/reproducing apparatus as a whole, as well as, enabling the apparatus to have also the reliability of information (i.e., high quality) therewith.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. An information recording/reproducing apparatus, comprising:
   a spindle motor which rotationally drives an optical disk of rewritable type at a predetermined speed;
   an information recording portion which records information thereon, through irradiating a laser beam upon an information recording surface of said rewritable type optical disk, which is rotationally driven by said spindle motor;
   an information reproducing portion which reproduces information recorded thereon, through detecting a reflection laser light upon the information recording surface of said rewritable type optical disk; and
   a controller portion which conducts a read modify write operation upon said rewritable type optical disk, the controller configured to:
   determine whether a range of a write command is consistent or not, with a unit of cluster of said rewritable type optical disk, when said write command onto said rewritable type optical disk needs no verify process thereon,
   execute said read modify write operation irrespectively of content of recorded information when said range of the write command is not consistent with the unit of cluster, and
   conduct the verify process only on a first cluster and a last cluster among a plurality clusters that are written through said read modify write operation.

2. The information recording/reproducing apparatus, as described in the claim 1, wherein said verify process is executed by a seek operation of said apparatus.

3. The information recording/reproducing apparatus, as described in the claim 1, wherein said information is written onto the information recording surface of said rewritable optical disk without executing said read modify write operation when the write command to said rewritable optical disk does not need the verify process and said write command is consistent with the unit of cluster of said rewritable optical disk.

4. The information recording/reproducing apparatus, as described in the claim 1, wherein, when a read error occurs at a cluster corresponding to the range of the write command while executing the read modify write operation, the information which indicates that valid data is included in the clusters where the read error occurs is inserted into the information to be recorded with the read modify write operation.

5. An information recording method for recording desired information on an information recording surface of a rewritable optical disk, through a read modify write operation with recording or reproducing of information, comprising at least the following steps of:
   determining whether a range of a write command is consistent or not, with a unit of cluster of said rewritable type optical disk, when the write command onto said rewritable type optical disk needs no verify process thereon;
   executing said read modify write operation irrespectively of content of recorded information when said range of the write command is not consistent with the unit of cluster; and
   conducting the verify process only on a first cluster and a last cluster among a plurality of clusters that are written through said read modify write operation.

6. The information recording method, as described in the claim 5, wherein said verify process is executed by a seek operation of said apparatus.

7. The information recording method, as described in the claim 5, wherein said information is written onto the information recording surface of said rewritable optical disk without executing said read modify write operation when the write command to said rewritable optical disk does not need the verify process and said write command is consistent with the unit of cluster of said rewritable optical disk.

8. The information recording method, as described in the claim 5, wherein, when readout is impossible in part of the clusters corresponding to said command upon executing said read modify write operation, said read modify write operation is executed with adding information indicative of a correct information position in part of sectors of user data corresponding to said clusters.

* * * * *